United States Patent
Juvekar (10) Patent No.: US 11,804,971 B2
(45) Date of Patent: Oct. 31, 2023

(54) CORRECTING PHYSICAL UNCLONABLE FUNCTION ERRORS BASED ON SHORT INTEGERS SOLUTIONS TO LATTICE PROBLEMS

(71) Applicant: Analog Devices, Inc., Norwood, MA (US)

(72) Inventor: Chiraag Juvekar, Cambridge, MA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 16/986,127

(22) Filed: Aug. 5, 2020

(65) Prior Publication Data

US 2022/0045871 A1    Feb. 10, 2022

(51) Int. Cl.
  *H04L 9/32*    (2006.01)
  *H04L 9/08*    (2006.01)
  *H04L 9/06*    (2006.01)

(52) U.S. Cl.
  CPC .......... *H04L 9/3278* (2013.01); *H04L 9/0643* (2013.01); *H04L 9/0894* (2013.01)

(58) Field of Classification Search
  CPC .... H04L 9/3278; H04L 9/0643; H04L 9/0894
  USPC .......................................................... 380/44
  See application file for complete search history.

(56) References Cited

U.S. PATENT DOCUMENTS

| | | | |
|---|---|---|---|
| 8,868,923 B1 * | 10/2014 | Hamlet | .......... G06F 21/32 |
| | | | 713/186 |
| 8,918,647 B1 | 12/2014 | Wallrabenstein | |
| 9,018,972 B1 | 4/2015 | Gurrieri et al. | |
| 9,020,150 B2 | 4/2015 | Beckmann et al. | |
| 9,292,692 B2 | 3/2016 | Wallrabenstein | |
| 9,672,342 B2 | 6/2017 | Walsh et al. | |
| 9,715,590 B2 | 7/2017 | Gardner et al. | |
| 9,806,718 B2 | 10/2017 | Wallrabenstein | |
| 9,946,858 B2 | 4/2018 | Wallrabenstein | |
| 9,996,480 B2 | 6/2018 | Walsh et al. | |
| 9,998,445 B2 | 6/2018 | Wallrabenstein | |

(Continued)

FOREIGN PATENT DOCUMENTS

| CN | 107004441 A | 8/2017 |
|---|---|---|
| CN | 108243007 A | 7/2018 |

(Continued)

OTHER PUBLICATIONS

Wang, Ye, Xiaodan Xi, and Michael Orshansky. "Lattice PUF: A strong physical unclonable function provably secure against machine learning attacks." Jun. 2020 IEEE International Symposium on Hardware Oriented Security and Trust (HOST). IEEE, 2020. (Year: 2020).*

(Continued)

*Primary Examiner* — Kambiz Zand
*Assistant Examiner* — Phuc Pham
(74) *Attorney, Agent, or Firm* — Wolf, Greenfield & Sacks, P.C.

(57) ABSTRACT

Physical unclonable functions (PUFs) are described. The PUFs utilize intrinsic information to determine the confidence level of comparison values. The information about confidence levels may be used to simplify the process of recovering the PUF secret. Since the information about confidence levels may be intrinsic, and not know outside the PUF, the PUF may be secure.

19 Claims, 10 Drawing Sheets

(56) References Cited

U.S. PATENT DOCUMENTS

| | | | |
|---|---|---|---|
| 10,013,543 | B2 | 7/2018 | Walsh et al. |
| 10,230,369 | B2 | 3/2019 | Plusquellic et al. |
| 10,382,962 | B2 | 8/2019 | Walsh et al. |
| 10,425,235 | B2 | 9/2019 | Wallrabenstein et al. |
| 10,432,409 | B2 | 10/2019 | Wallrabenstein |
| 10,439,613 | B2 | 10/2019 | Karpinskyy et al. |
| 10,439,829 | B1 | 10/2019 | Lin et al. |
| 10,521,616 | B2 | 12/2019 | Wallrabenstein |
| 10,749,694 | B2 | 8/2020 | Adams et al. |
| 10,771,267 | B2 | 9/2020 | Wallrabenstein |
| 2015/0134966 | A1 | 5/2015 | Wallrabenstein |
| 2018/0167391 | A1* | 6/2018 | Lawson ............ H04L 63/0876 |
| 2018/0351753 | A1 | 12/2018 | Gardner et al. |
| 2018/0351754 | A1 | 12/2018 | Wallrabenstein et al. |
| 2019/0190726 | A1 | 6/2019 | Wallrabenstein |
| 2019/0342104 | A1* | 11/2019 | Adams ................. H04L 9/3278 |
| 2019/0352104 | A1 | 11/2019 | Cano Coscia et al. |
| 2020/0106626 | A1 | 4/2020 | Wallrabenstein |
| 2020/0280551 | A1 | 9/2020 | Wallrabenstein |

FOREIGN PATENT DOCUMENTS

| | | |
|---|---|---|
| CN | 109475327 A | 3/2019 |
| EP | 3 044 793 B1 | 4/2017 |
| GB | 2507988 A | 5/2014 |
| KR | 20190049006 A | 5/2019 |
| KR | 20190049069 A | 5/2019 |
| KR | 20190049332 A | 5/2019 |
| KR | 20190102950 A | 9/2019 |
| KR | 20190102960 A | 9/2019 |
| KR | 20190102961 A | 9/2019 |
| KR | 20190138116 A | 12/2019 |
| KR | 20190138120 A | 12/2019 |
| KR | 20190138300 A | 12/2019 |

OTHER PUBLICATIONS

Stanzione et al., CMOS Silicon Physical Unclonable Functions Based on Intrinsic Process Variability. IEEE Journal of Solid-State Circuits. Jun. 2011:46(6):1456-1463.

Yan et al., PUF-Based Fuzzy Authentication Without Error Correcting Codes. IEEE Transactions on Computer-Aided Design of Integrated Circuits and Systems. Sep. 2017: 36(9): 1445-1457.

Extended European Search Report dated Dec. 1, 2021 for European Application No. 21187537.2.

Herder et al., Trapdoor Computational Fuzzy Extractors and Stateless Cryptographically-Secure Physical Unclonable Functions. IACR, International Association for Cryptologic Research. Last retrieved Feb. 20, 2016. vol. 20160509:002057, p. 1-17.

Maes et al., A Soft Decision Helper Data Algorithm for SRAM PUFS. IEEE 2009. International Symposium Information Theory (ISIT) Jun. 28, 2009. pp. 2101-2105.

* cited by examiner

CORRECTING PHYSICAL UNCLONABLE FUNCTION ERRORS BASED ON SHORT INTEGERS SOLUTIONS TO LATTICE PROBLEMS

FIELD OF THE DISCLOSURE

The present application relates to physical unclonable functions (PUFs).

BACKGROUND

Physical unclonable functions (PUFs) produce a unique output signal for a given input signal. The PUF includes a physical component that possesses unique characteristics due to manufacturing variances. As a result, applying an input signal to the PUF results in an output signal that is unique due to the unique characteristics of the PUF.

SUMMARY OF THE DISCLOSURE

According to an aspect of the present application, physical unclonable functions (PUFs) are described. The PUFs utilize intrinsic information to determine the confidence level of comparison values. The information about confidence levels may be used to simplify the process of recovering the PUF secret. Since the information about confidence levels may be intrinsic, and not know outside the PUF, the PUF may be secure.

According to some embodiments, a physical unclonable function (PUF) is provided, comprising: a plurality of physical structures; comparison circuitry configured to produce a bit stream representing comparison values of a plurality of comparisons of values of a first property of the plurality of physical structures; enrollment processing circuitry configured to receive the bit stream and generate both a secret and a sketch; and recovery processing circuitry configured to process in combination a bit stream, the sketch, and information indicative of a confidence level of bits in the bit stream.

According to some embodiments, a physical unclonable function (PUF) is provided, comprising: a plurality of physical structures having respective values of a first property; readout circuitry configured to compare pairs of values of the first property of respective pairs of the plurality of physical structures and to generate a digital stream of bits from a result of the comparisons; and first processing circuitry configured to generate a secret and a sketch from the digital stream of bits; and second processing circuitry configured to recover the secret by processing in combination the digital stream of bits, the sketch, and information indicative of a confidence level of bits in the digital stream of bits.

According to some embodiments, a method of operating a physical unclonable function (PUF) to recover a secret, comprising: receiving a response bit stream resulting from application of a plurality of challenge values to the PUF; receiving a sketch; receiving information indicative of a confidence level of bits in the response bit stream; and solving a learning with errors (LWE) problem using the response bit stream, the sketch, and the information indicative of the confidence level of bits in the response bit stream.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

According to an aspect of the present application, a physical unclonable function (PUF) is provided that includes processing circuitry that solves a hard mathematical problem using knowledge of the intrinsic, physically unique properties of the components of the PUF. In a process of enrolling the PUF, at least three pieces of information may be developed. A PUF secret may be produced from a series of comparison values representing comparisons between physical structures of the PUF. A sketch, also referred to as "helper data," may be produced through matrix multiplication of the series of comparison values. In addition, confidence levels for the bits in the series of comparison values may be determined. The PUF secret may be output from the PUF. The sketch and the confidence levels of the bits may be stored for use by the PUF in a recovery process.

According to an aspect of the present application, a method of recovering a secret from a PUF may include issuing a challenge to the PUF, receiving a response, and solving for the PUF secret using the stored sketch and the confidence levels for the bits in the series of comparison values. Solving for sketch may involve solving a hard mathematical problem—meaning that the problem is mathematically challenging to solve—such as a learning with errors (LWE) problem. The use of a hard mathematical problem provides heightened security. For example, as compared to an approach using error correction, use of a hard mathematical problem provides a more secure alternative. The hard mathematical problem may be sufficiently difficult as to be impractical to solve without additional information.

However, the confidence levels of the bits in the series of comparison values may be used within the PUF to reduce the hard mathematical problem to a problem that is more easily solved. Since the confidence levels of the bits of the series of comparison values are stored internally and not known to external attackers, the hardness of the mathematical problem may differ for external attackers than for the PUF itself. In this manner, the security of the PUF may be greater than a construction that uses the same information to solve for the PUF secret that might be available to an external attacker.

Figure 1:
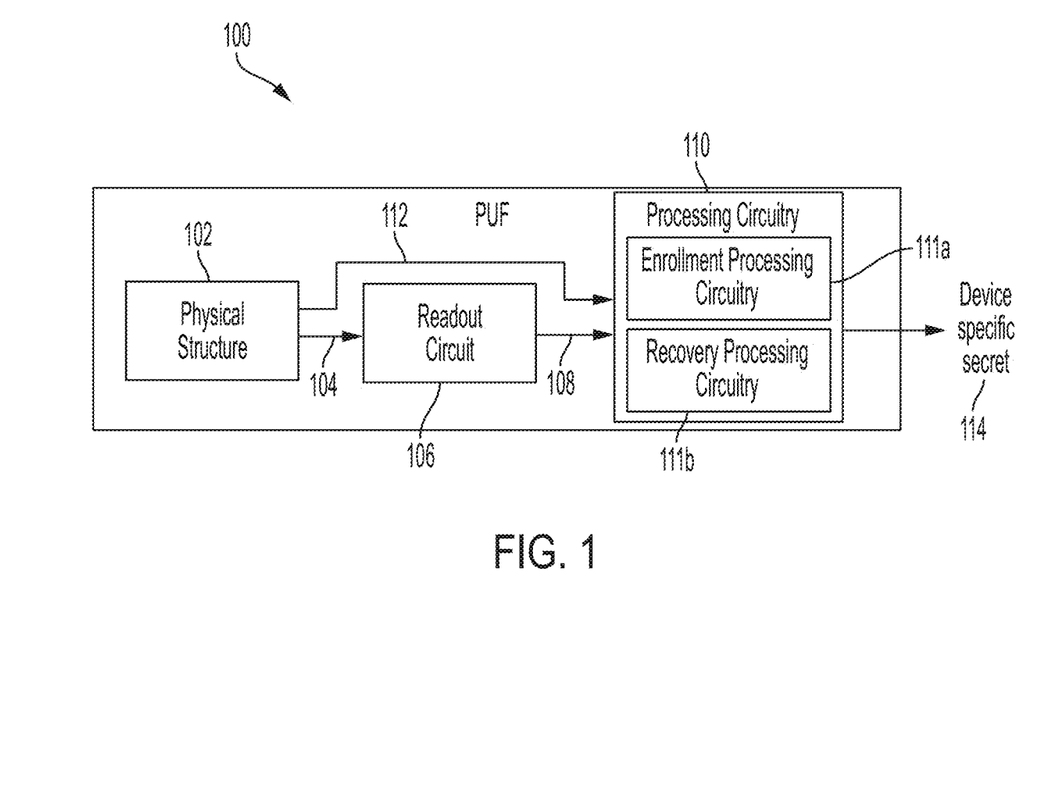
FIG. 1 is a block diagram of a physical unclonable function (PUF) having processing circuitry configured to execute a hard mathematical problem, according to a non-limiting embodiment of the present application.

As described above, an aspect of the present application provides a PUF that includes processing circuitry that solves a hard mathematical problem using knowledge of the intrinsic, physically unique properties of the components of the PUF. FIG. 1 is a block diagram of a physical unclonable function (PUF) having processing circuitry configured to execute a hard mathematical problem, according to a non-limiting embodiment of the present application. The PUF 100 comprises a physical structure 102, readout circuit 106, and processing circuitry 110, including enrollment processing circuitry 111*a* and recovery processing circuitry 111*b*.

The physical structure 102 may include a plurality of physical components having unique physical properties due to manufacturing differences. As one non-limiting example, the physical structure 102 may comprise a plurality of resistors fabricated on a semiconductor die. As another example, the physical structure 102 may comprise a plurality of ring oscillators. As another example, the physical structure 102 may comprise a plurality of capacitors. As another example, the physical structure 102 may comprise a plurality of transistors. The components of the physical structure 102 may exhibit differing values of one or more properties of interest due to manufacturing differences. For example, when the physical structure comprises a plurality of resistors, the resistors may exhibit different resistance values or different capacitance values due to manufacturing differences. When the physical structure 102 comprises a plurality of ring oscillators, the ring oscillators may exhibit different resonance frequencies due to manufacturing differences. A plurality of capacitors may exhibit different capacitances due to manufacturing differences. A plurality of transistors may exhibit different on-state resistances due to manufacturing differences.

The readout circuitry 106 may comprise a comparator or other suitable circuitry to compare values of a property of interest of the physical structure. In some embodiments, the readout circuitry 106 may include a switching circuit or other selection circuitry to select pairs of physical components of the physical structure 102 to compare. For example, if the physical structure 102 comprises a plurality of ring oscillators, the readout circuit 106 may comprise selection circuitry configured to compare the resonance frequencies of different pairs of the ring oscillators. The readout circuit 106 may include circuitry to measure or count a value of a property of interest. For example, if the physical structure 102 comprises ring oscillators, the readout circuit 106 may include circuitry configured to determine a resonance frequency of the ring oscillators.

The processing circuitry 110 may include suitable circuitry for computing a secret of the PUF 100 and for recovering the secret by solving a hard mathematical problem based on an output of the readout circuit. The processing circuitry may be implemented as an application specific integrated circuit (ASIC), microprocessor, or other suitable circuitry.

As shown, the processing circuitry 110 comprises enrollment processing circuitry 111*a* and recovery processing circuitry 111*b*, in this non-limiting example. In some embodiments, the enrollment processing circuitry and recovery processing circuitry are distinct, for example representing different parts of an integrated circuit. In some embodiments, the enrollment processing circuitry and recovery processing circuitry are the same circuitry, capable of performing enrollment and recovery processing. The enrollment processing circuitry may operate during enrollment of the PUF. The enrollment processing circuitry may produce the PUF secret, a sketch, and confidence levels of bits in the PUF secret. The processing circuitry 110 may be configured to output the PUF secret, and to store the sketch and the confidence levels of the bits in the PUF secret. The recovery processing circuitry 111*b* may operate during recovery of the PUF secret. A challenge may be issued to the PUF 100, for example in the form of a plurality of challenge values, resulting in generation of a bit stream from the readout circuit 106. The recovery processing circuitry 111*b* may be configured to receive the bit stream, the sketch, and the confidence levels of the bits in the bit stream. The recovery processing circuitry 111*b* may be configured to output the PUF secret. Further detail is provided below.

In some embodiments, the physical structure 102, readout circuit 106, and processing circuit 110 may be disposed within a housing. In some embodiments, they are formed on a common substrate, such as a common semiconductor substrate, although other implementations are possible. In some embodiments, the physical structure 102, readout circuit 106, and processing circuitry 110 are integrated on a silicon substrate.

In operation, the physical structure 102 outputs a signal 104 to the readout circuit 106. The signal may be an indication of a physical property of the physical structure, such as a resistance, frequency, or capacitance. The physical structure 102 may produce the output signal 104 actively, or in response to being polled by the readout circuit 106. The readout circuit 106 may perform a comparison, or a plurality of comparisons of values of the physical structure 102. The comparison(s) may be output from the readout circuit 106 as signal 108 to the processing circuitry 110. The signal 108 is a digital signal in at least some embodiments. In some embodiments, the processing circuitry 110 processes the comparison value(s) of signal 108 to generate a device specific PUF secret 114. An example of such processing is described further below.

As shown in FIG. 1, the processing circuitry 110 may also receive an output signal 112 directly from the physical structure 102. The output signal 112 represents intrinsic information about the physical structure 102. In some embodiments, the output signal 112 may include the same information as the signal 104. In some embodiments, the output signal 112 is an analog signal. The processing circuitry 110 may use the information in the output signal 112 to determine which bits of the signal 108 have a high confidence, and which do not. For example, in some embodiments the signal 108 may be a bit stream representing comparisons of resonance frequencies of ring oscillators. Some of those comparisons may carry a high level of confidence, for example when the frequency of a first of the compared ring oscillators differs significantly from the frequency of the second ring oscillator to which the first ring oscillator was compared. However, some of the comparisons may carry a low level of confidence, for example if the resonance frequencies of the first and second ring oscillators are close to each other and if the relative values are susceptible to changing with changes in process, voltage, or temperature (PVT). The processing circuitry 110 may identify which bits are certain (have a high confidence level) and which are uncertain. That information may be used in a recovery process, described further below.

Figure 2:
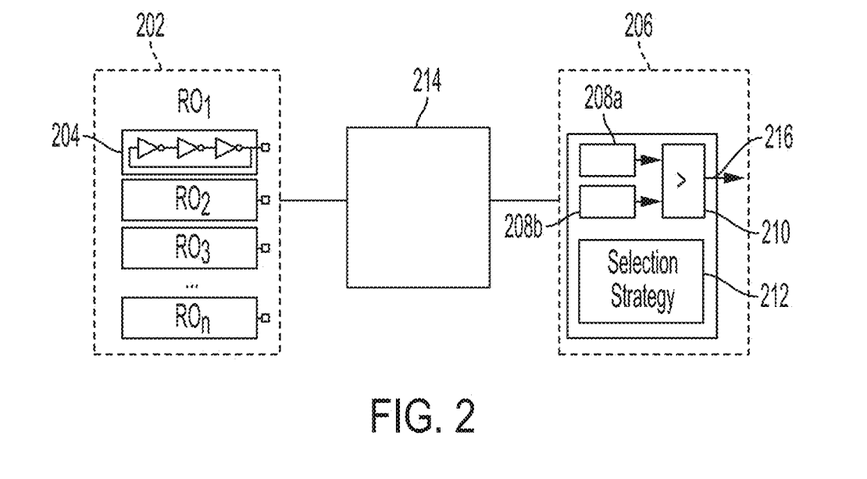
FIG. 2 is a diagram of a non-limiting implementation of the physical structure and readout circuit of the PUF of FIG. 1, according to a non-limiting embodiment of the present application.

As described above, the physical structure may comprise various types of components, such as resistors, ring oscillators, capacitors, or transistors. The non-limiting example of FIG. 2 illustrates a physical structure 202 comprising a plurality of ring oscillators 204. The physical structure 202 represents a non-limiting example of the physical structure 102. The ring oscillators 204 are identified as $RO_1$, $RO_2$, $RO_3 \ldots RO_n$. The total number n of ring oscillators may be between 10 and 100 ring oscillators, including any value within that range, or may be any other suitable number. The ring oscillators may have respective resonance frequencies, differing due to manufacturing imperfections. That is, even though the ring oscillators may be manufactured to have the same resonance frequency, they may differ due to manufacturing imperfections. Moreover, the ring oscillators may have different resonance frequencies than ring oscillators made on a different part of a same semiconductor wafer. Thus, the ring oscillators 204 of a physical structure 202 of a given PUF may have unique resonance frequencies, giving that particular PUF unique physical characteristics.

FIG. 2 further illustrates a readout circuit 206. The readout circuit 206 may represent a non-limiting example of the readout circuit 106 of FIG. 1. As shown, the readout circuit may include a first counter 208a, a second counter 208b, a comparator 210, and a selection strategy circuit 212. The selection strategy circuit 212 may execute a strategy to select different pairs of the ring oscillators 204 for comparison. The strategy executed may be input to the PUF as a challenge. The selection strategy circuit 212 may control selection of the ring oscillators by controlling a selection mechanism 214, which may be a switching matrix, a multiplexer, or any other suitable mechanism. The counters 208a and 208b may determine the resonance frequencies of the two selected ring oscillators by counting features—for example, peaks—of the signals output by the ring oscillators. The counts may be compared by the comparator 210, which outputs the resulting series of comparison values 216. The series of comparison values 216 may be a digital bit stream. The bits of the bit stream may have associated confidence levels depending on how close the counts were giving rise to that particular bit.

Figure 3:
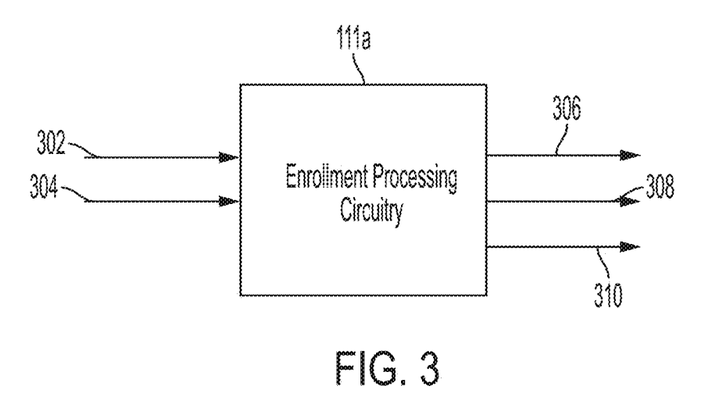
FIG. 3 is a block diagram of the enrollment processing circuitry of the PUF of FIG. 1, according to a non-limiting embodiment.

FIG. 3 is a block diagram of the enrollment processing circuitry of the PUF 100 of FIG. 1, according to a non-limiting embodiment. The enrollment processing circuitry is configured to receive a digital bit stream 302, and an analog signal 304, and to output a PUF secret 306, a sketch 308, and a confidence signal 310, in this non-limiting embodiment.

The digital bit stream 302, which may represent the signal 104 of FIG. 1, may be a stream of comparison values. For example, the digital bit stream may be a series of comparison values generated by a readout circuit, such as readout circuit 106. The digital values of the digital bit stream may represent individual comparisons of values of a property of the physical structures of the PUF. For example, the physical structures may be the type shown in FIG. 2, and the digital bit stream may be the series of comparison values 216 of FIG. 2.

The analog signal 304 may represent intrinsic information about the physical structures themselves. For example, if the physical structures are resistors, the analog signal 304 may be the resistance values. If the physical structures of the PUF are ring oscillators, as in FIG. 2, the analog signal 304 may be the frequency counts of the ring oscillators. For example, the analog signal 304 may be the count values from the counters 208a and 208b.

The enrollment processing circuitry 111a may generate the PUF secret 306 using any suitable processing. As a non-limiting example, the PUF secret may be a hash of the digital bit stream 302. The enrollment processing circuitry 111a may include suitable circuitry to perform the hash.

The sketch 308 may be calculated using a matrix. For example, the sketch 308 may be given by the multiple of a matrix A by the vector x, where the vector x represents the digital bit stream 302. The matrix A may be a random matrix. In some embodiments, the enrollment processing circuitry 111a may generate the matrix A from a seed. In some embodiments, the enrollment processing circuitry 111a may store the matrix A and call it when needed to generate sketch 308.

Confidence signal 310 may represent the confidence level of bits in the digital bit stream 302. As described previously, the bits resulting from comparison of values of a property of the physical structure may have different levels of confidence. Compared values of the property that are closer to each other provide a lower degree of confidence than compared values that are farther from each other. This information may be used to later recover the PUF secret during a recovery operation, as will be described further below. For example, the confidence levels may be used to reduce the hardness of a learning with errors (LWE) problem. In some embodiments, compared values that differ from each other by more than a threshold are determined to be confident bits that may be fixed in subsequent processing, while compared values that differ from each other by less than a threshold are determined to be uncertain bits. The confidence signal 310 represents intrinsic information that the PUF has but that external attackers do not.

As has been described, aspects of the present application utilize a LWE problem to improve the security of a PUF. The security may depend on the hardness of the problem. A non-limiting example of the enrollment process in such a scheme, as may be performed by the enrollment processing circuitry 111a, is now described.

procedure Enroll(F)

A=PRG(seed)  ▶ Sample A← $\mathbb{Z}_q^{n \times m}$
x=step($f_r$–$f_l$)
sketch=A·x
sk=Hash(x)
return (sk, sketch)
end procedure The enrollment procedure may be defined as F. A matrix A may be provided, and may be generated from a seed (A=PRG(seed)). As described above, the matrix A may be a random matrix. In this particular non-limiting example, A is a random matrix with n rows and m columns, where each entry is an integer from 0 to q-1. The vector x may be defined as the comparison values of properties of a physical structure of the PUF, written as x=step($f_r$–$f_l$). Here, "step" represents the comparison. $f_r$ represents a "right" physical structure, and $f_l$ represents a "left" physical structure. The terms "right" and "left" are used to differentiate the physical structures of the compared pair, and not to indicate any particular relative positioning. The term sketch may be calculated by matrix multiplication, namely as sketch=A·x. The term sk may be defined as the hash of x, namely sk=Hash(x). The result of the enrollment procedure is to output sk and sketch.

Figure 4:
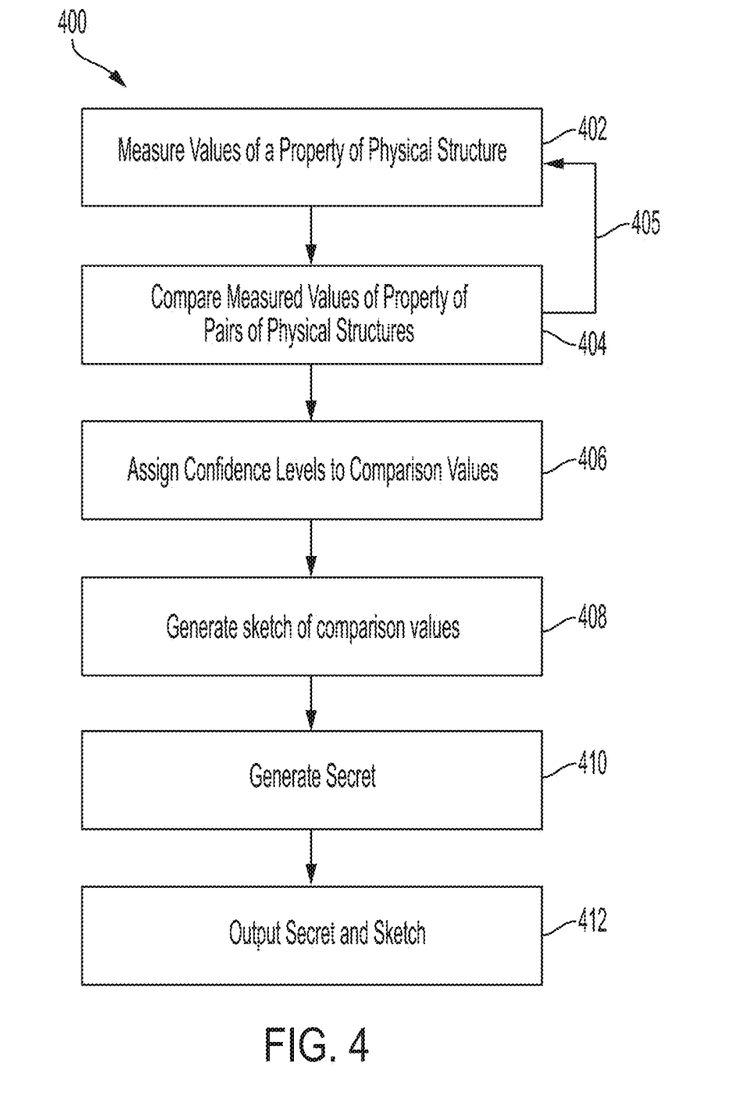
FIG. 4 is a flowchart of a method of an enrollment operation of a PUF, according to a non-limiting embodiment of the present application.

FIG. 4 is a flowchart of a method of an enrollment operation of a PUF, according to a non-limiting embodiment of the present application. The method 400 is consistent with the example just described, and may be executed by a PUF such as PUF 100. The method 400 begins at act 402, where values of a property of the physical structure of the PUF are measured. For example, as described previously, the physical structure may include a plurality of ring oscillators. The property may be the resonance frequency of a ring oscillator. At act 402, the resonance frequencies of two ring oscillators may be measured. For example, referring to FIG. 2, the first counter 208a and second counter 208b may be used to measure the resonance frequency of a ring oscillator, or a plurality of ring oscillators.

At act 404, the measured values from act 402 may be compared. That is, act 404 may involve comparing measured values of the property of interest for pairs of physical structures. For example, referring again to FIG. 2, the comparator 210 may compare the measured resonance frequency values of a pair of ring oscillators and may generate a comparison bit.

As shown by arrow 405, acts 402 and 404 may be iterated to generate a desired number of comparison bits. In some embodiments, between 10 and 100 bits may be generated, although other numbers are possible. The more bits generated, the more secure the PUF secret that is generated in later processing will be.

At act 406, the comparison values from act 404 may be assigned confidence levels. For example, the measured values that go into any given comparison may be assessed to determine how close they are. Values that are within some threshold of each other may be determined to have a low confidence, meaning that they are susceptible to flipping when the PUF is deployed. Using the construction of FIG. 2 as a non-limiting example, first counter 208a may output a first count value, and second counter 208b may output a second count value. If the first and second count values are within some threshold of each other, the comparison result from comparing the first count value to the second count value may be assigned a low confidence level. If the first count value and second count value differ by more than the threshold, the comparison result may be assigned a higher confidence level. The threshold may be set to provide a desired confidence level in the assessment of comparison results. In some embodiments, then, act 406 involves identifying a difference in the compared values and comparing that difference to a threshold, and assessing whether the difference is below the threshold such that the comparison result is susceptible to flipping. The result of act 406 is an assignment of confidence levels to the comparison bits resulting from act 404. These confidence levels may make up a confidence signal, such as confidence signal 310 of FIG. 3.

In act 408, a sketch of the comparison values from act 404 may be generated, consistent with the manner of generating a sketch as described in connection with FIG. 3. For example, the comparison values may make up a vector, which may be multiplied by a matrix A of the type described previously. In at least some embodiments, the sketch is generated from comparison values based on a hard mathematical problem.

In act 410, the PUF secret may be generated. In some embodiments, the PUF secret may be generated as a hash of the comparison values resulting from act 404.

In act 412, the PUF secret and the sketch may be output.

The ordering of acts of method 400 may be different than that shown. For example, acts 406, 408, and 410 may be performed in a different order. In some embodiments, two or more of acts 406, 408, and 410 may be performed substantially in parallel.

Figure 5:
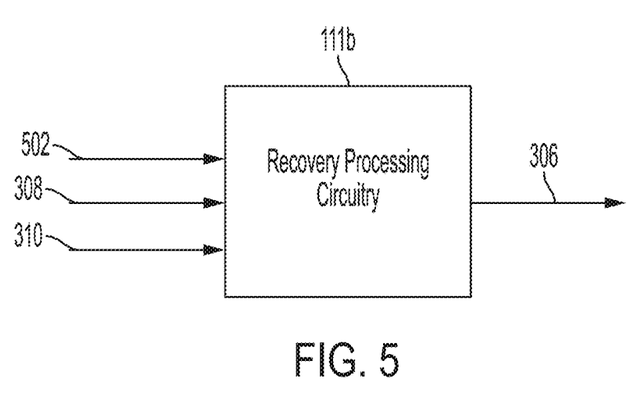
FIG. 5 is a block diagram of the recovery processing circuitry of the PUF of FIG. 1, according to a non-limiting embodiment.

FIG. 5 is a block diagram of the recovery processing circuitry of the PUF of FIG. 1, according to a non-limiting embodiment. The recovery processing circuitry 111b is configured to solve a hard mathematical problem to recover the PUF secret. As described previously, in some embodiments the hard mathematical problem is a LWE problem, and the recovery processing circuitry 111b solves the problem using intrinsic information to simplify the problem. The intrinsic information includes information about the confidence level of bits in a received bit stream, in some embodiments.

As shown, the recovery processing circuitry 111b receives three inputs, including a digital bit stream 502, sketch 308, and confidence signal 310. The recovery processing circuitry 111b outputs the PUF secret 306.

The digital bit stream 502 is a bit stream generated during the recovery process. For example, when the PUF is deployed, a challenge may be issued to the PUF to authenticate it. In some embodiments, the challenge may take the form of a plurality of challenge values. The challenge gives rise to a bit stream 502. The bit stream 502 may differ from the digital bit stream 302 generated during the enrollment process because of variations in process, voltage, or temperature. For example, the PUF may be deployed in an environment with a different temperature than that at which the enrollment process was performed. As a result, certain comparison bits may assume different values than were generated during enrollment, even in response to the same challenge. As a non-limiting example, consider a PUF that employs ring oscillators as the physical structure. The resonance frequencies of the ring oscillators may be temperature dependent owing to changes in the properties of the materials from which the ring oscillators are fabricated. Comparison bits resulting from the comparison of measured resonance frequencies of the ring oscillators may flip if the relative values of the ring oscillator resonance frequencies change. Consider two ring oscillators, $RO_A$ and $RO_B$. The resonance frequencies of those ring oscillators may change at a different rate with respect to changes in temperature, such that at one temperature the resonance frequency of $RO_A$ may be greater than that of $RO_B$, and at a different temperature the resonance frequency of $RO_A$ may be less than that of $RO_B$. Thus, a comparison between the resonance frequencies during enrollment may produce a different comparison bit than the same comparison done at a different temperature when the PUF is deployed. Reasons other than changes in temperature may also result in different comparison bit values during recovery than during enrollment.

The recovery processing circuitry 111b may process the bit stream 502, sketch 308, and confidence signal 310 in combination to recover the PUF secret, even in the presence of differences between the bit stream 502 and the digital bit stream 302. A non-limiting example of a recovery process is shown below.

procedure Recover ($\hat{F}$, sketch)
A=PRG (seed)
$\hat{x}$=step $(\hat{f}_r - \hat{f}_l)$
$\hat{x}$=Trapdoor ($\hat{x}$, $\hat{F}$) ▶ Fix (m−n) bits of $\hat{x}$
Solve: sketch=A·$\hat{x}$ ▶ Solve for n bits of $\hat{x}$
sk=Hash($\hat{x}$)
return sk
end procedure The bit stream 502 may be represented by $\hat{x}$. The process may involve solving for sketch=A·$\hat{x}$. To solve, some bits of $\hat{x}$ may be fixed. These are the bits that have a relatively high confidence level as defined by the confidence signal 310. The remaining bits have lower confidence levels, indicating that they may have flipped between enrollment and recovery, for example due to changes in temperature or voltage. However, solving this reduced problem for sk is significantly simpler over the smaller space of n uncertain bits than over the larger space of m total bits of bit stream 502. It should be understood that this approach differs from an approach that simply ignores the uncertain bits. Instead, both the certain bits and uncertain bits are used to solve the LWE problems, but the certain bits are treated as knowns. An example of the processing is described further below.

Using the method described above, more errors in a PUF signal may be corrected with a lower loss in entropy than would be possible using an error correction code. For example, considering a matrix A and a BCH code word of substantially equal length, the method described above may correct between 10% and 50% more errors than the use of error correction with a BCH code, without the same loss in entropy as would be realized from using a BCH code. Moreover, no additional true random number generation hardware is needed for the method described above. Thus, the size occupied by the PUF may be reduced compared to error correction code techniques.

Figure 6:
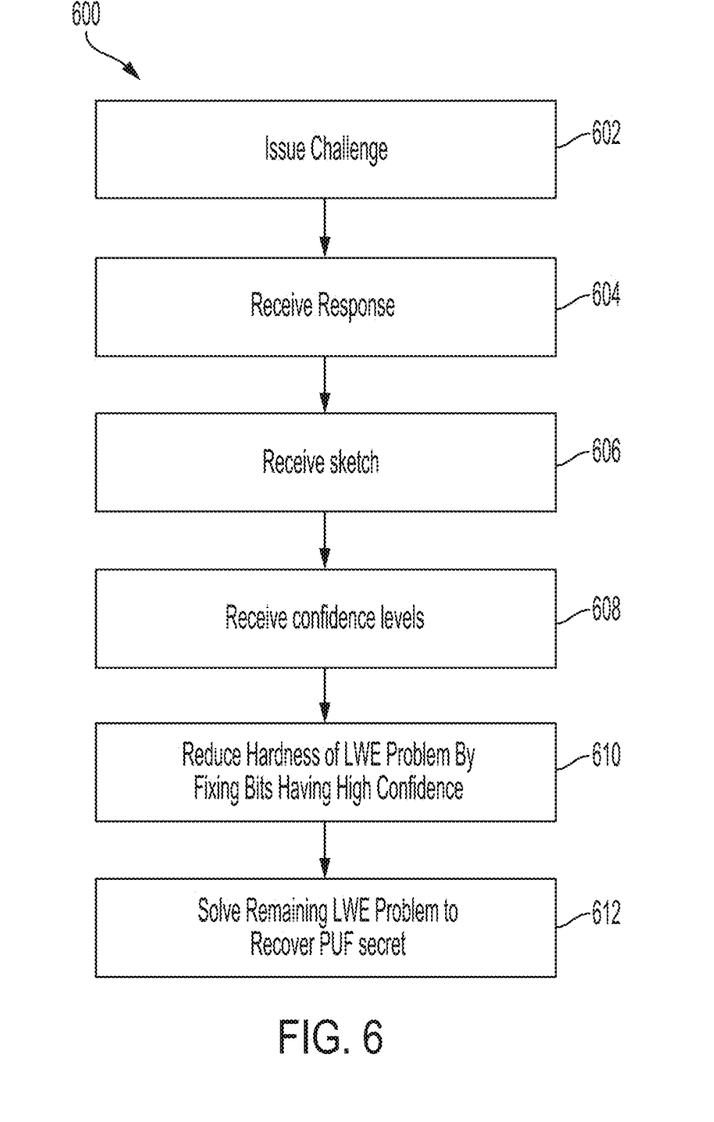
FIG. 6 is a flowchart of a method of a recovery operation of a PUF, according to a non-limiting embodiment of the present application.

FIG. 6 is a flowchart of a method of a recovery operation of a PUF, according to a non-limiting embodiment of the present application. The method 600 may be executed by recovery processing circuitry, such as recovery processing circuitry 111b of the PUF 100. The method 600 begins at act 602 by issuing a challenge to the PUF. The challenge may be part of authenticating the PUF. For example, the PUF may be part of a sensor device deployed in the field to monitor a condition of interest, and a user may want to verify the identity of the sensor device by authenticating the PUF. The challenge used at act 602 may be the same challenge used during enrollment of the PUF.

At act 604, the recovery processing circuitry may receive the response to the challenge. The response may be a digital bit stream. For example, the response may be bit stream 502 of FIG. 5.

At act 606, the recovery processing circuitry may receive sketch from the enrollment processing circuitry. For example, the sketch may be sketch 308.

At act 608, the recovery processing circuitry may receive confidence levels indicating a confidence of bits in the bit stream received at act 604. For example, the confidence levels may be in the form of confidence signal 310.

At act 610, the recovery processing circuitry may reduce the hardness of the LWE problem for solving for the PUF secret by fixing the bits of the received bit stream from act 604 having a high confidence level as indicated by the confidence levels from act 608, and solving that portion of the problem.

At act 612, the recovery processing circuitry may solve the remaining LWE problem for the bits of the received bit stream having lower confidence levels, thus recovering the PUF secret.

Thus, the method 600 represents an example of a PUF using intrinsic information in the form of confidence levels to recover the PUF secret.

The acts of method 600 may be performed in an order other than that shown. For example, acts 604, 606, and 608 may be performed in a different order, or two or more of them may be performed substantially in parallel.

Figure 7A:
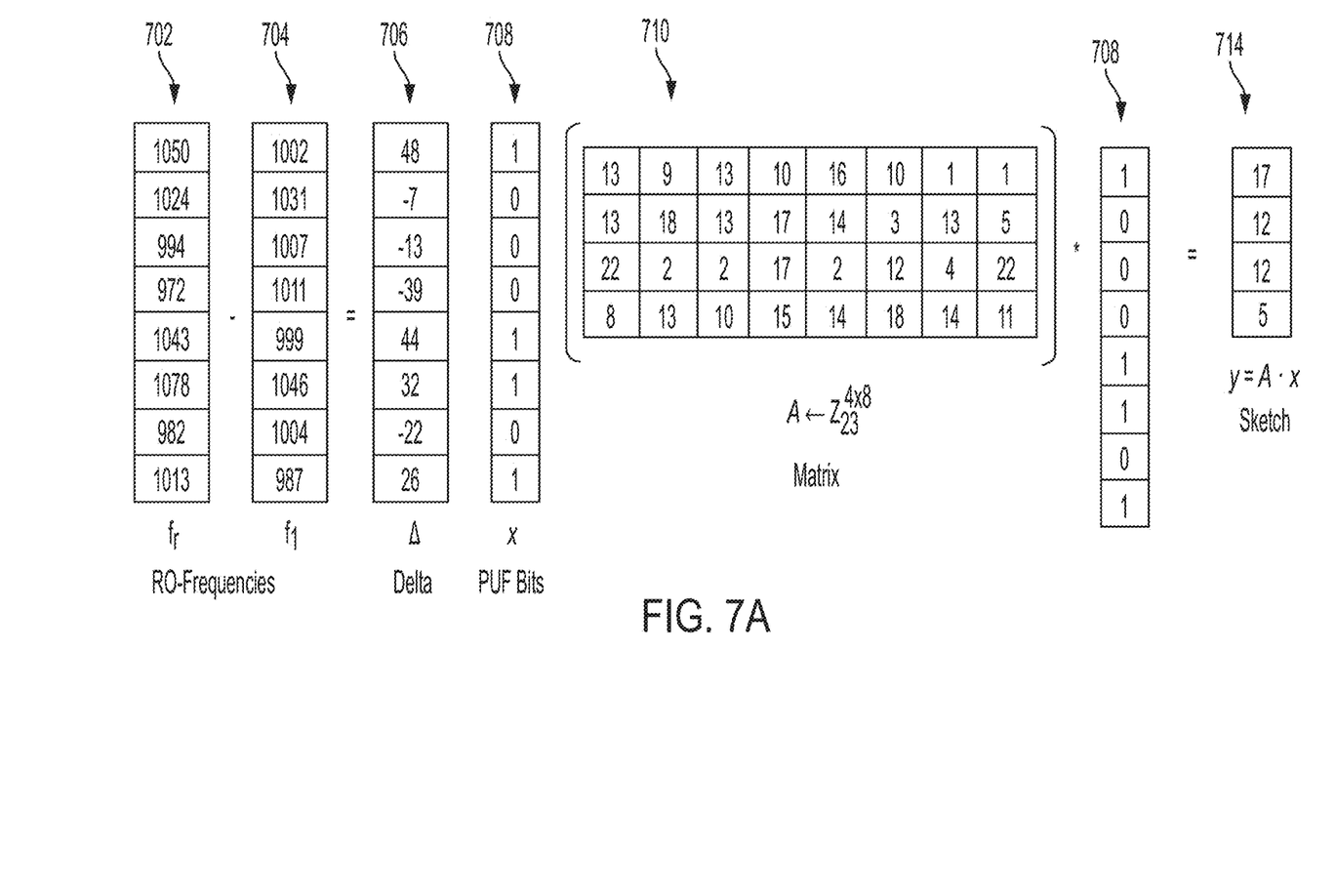
FIG. 7A illustrates an example of a PUF enrollment process, according to a non-limiting embodiment of the present application.
Figure 7B:
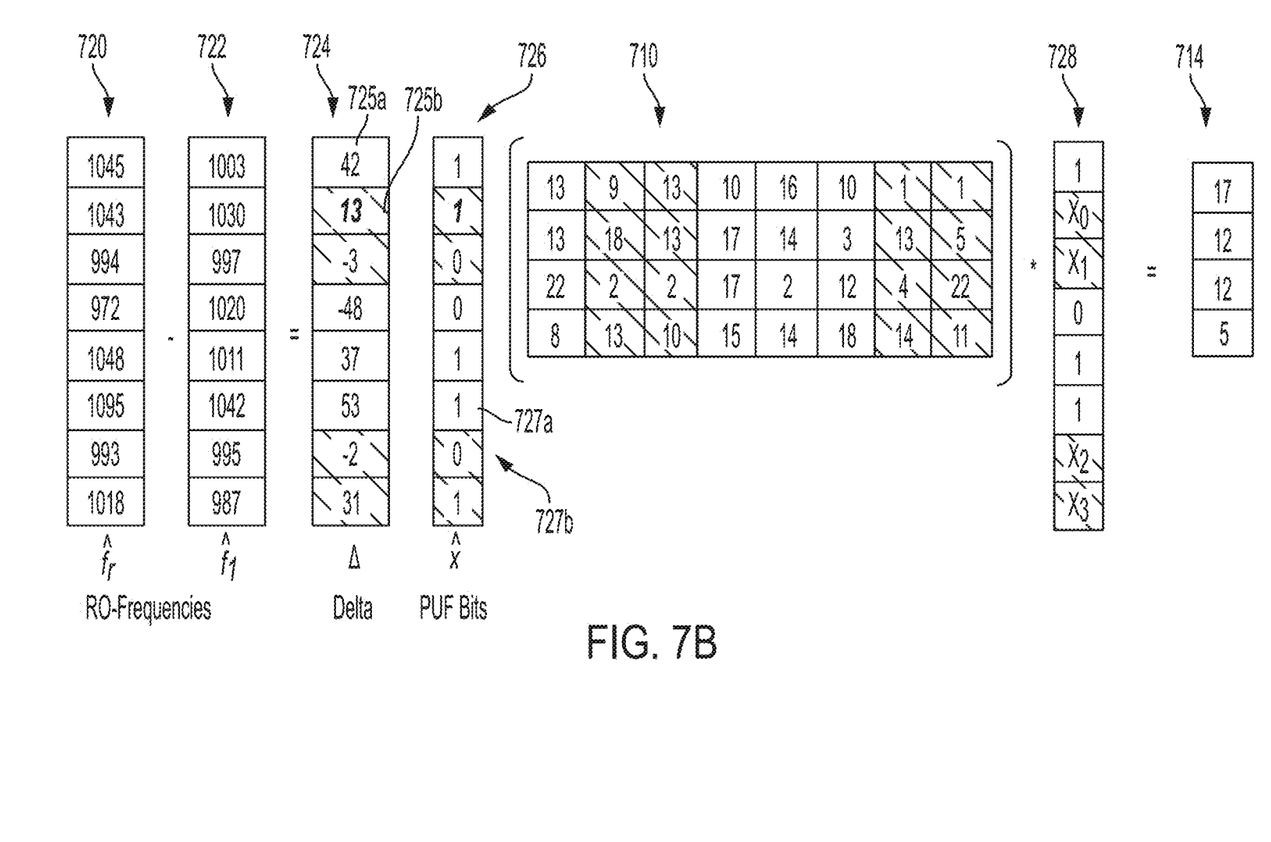
FIG. 7B illustrates an example of a PUF recovery process for the enrollment process of FIG. 7A, according to a non-limiting embodiment of the present application.
Figure 7C:
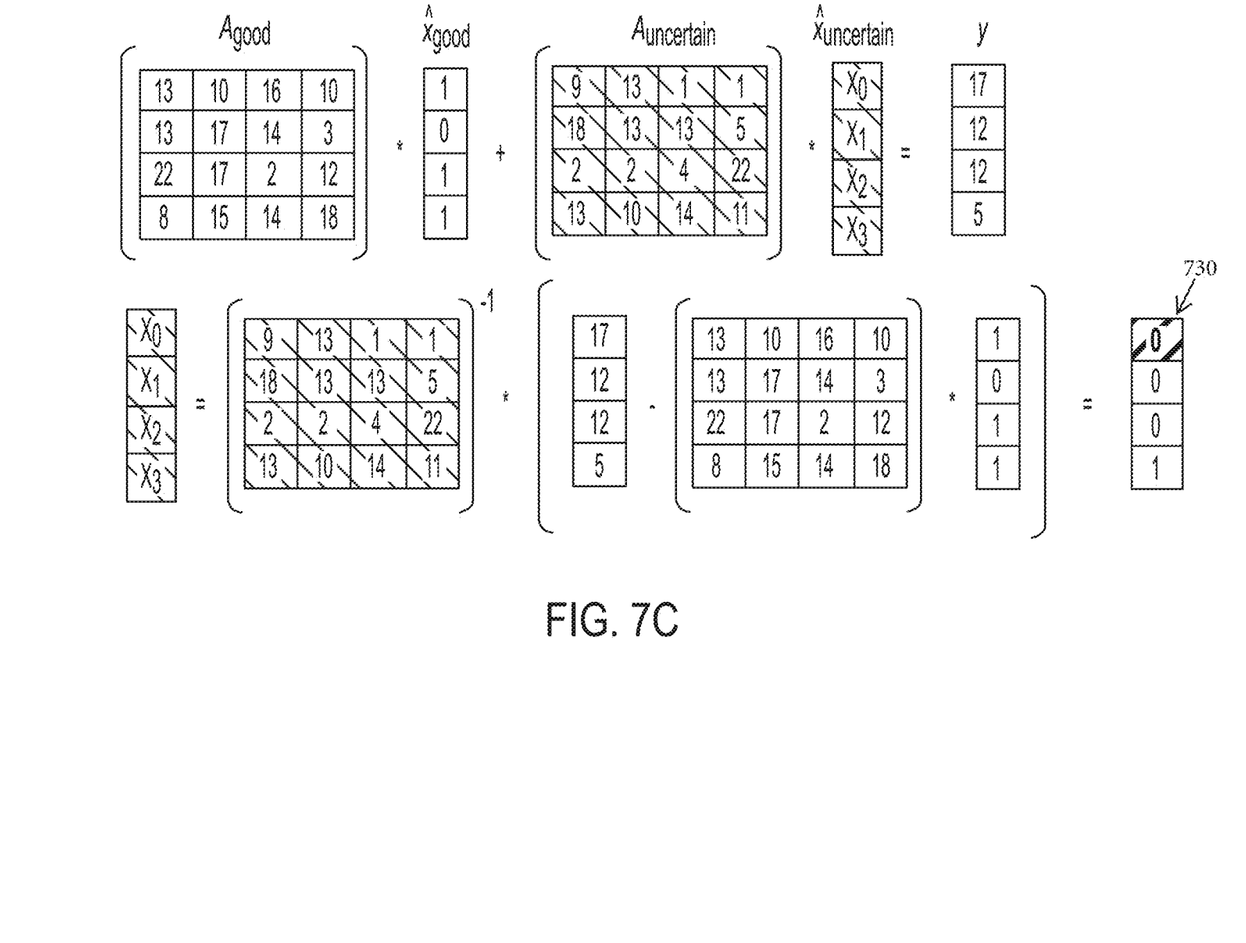
FIG. 7C illustrates an example of reducing the hardness of the PUF recovery process of FIG. 7B, according to a non-limiting embodiment of the present application.

FIGS. 7A-7C illustrate a PUF enrollment and recovery process according to aspects of the present application. FIG. 7A illustrates an example of a PUF enrollment process, according to a non-limiting embodiment of the present application. The enrollment process illustrated in FIG. 7A may be performed by the PUF 100 of FIG. 1, as a non-limiting example. For purposes of this example, the physical structure of the PUF has a plurality of ring oscillators, with corresponding ring oscillator frequencies. The ring oscillator frequencies may be identified as $f_r$ 702 and $f_l$ 704. These represent pairs of ring oscillators, the frequencies of which may be compared. The corresponding differences in ring oscillator frequency are shown as Delta 706. The units of 702, 704, and 706 may be Hertz, or may be counts. The comparisons ($f_r-f_l$) produce comparison bits 708, which may also be referred to as the PUF bits. The comparison bits may also be denoted as x in this example. The matrix A, described previously, may take the form shown at 710 in the non-limiting example of FIG. 7A. Multiplying A by the comparison bits 708 produces the sketch 714 shown.

FIG. 7B illustrates an example of a PUF recovery process for the enrollment process of FIG. 7A, according to a non-limiting embodiment of the present application. For example, the PUF device for which the enrollment process is shown in FIG. 7A may be deployed in the field, and an authentication of the PUF device may be attempted. The authentication effort may produce resonance frequencies given by $\hat{f}_r$ 720 and $\hat{f}_l$ 722. As can be seen, some of the values of 720 and 722 differ from the corresponding values in FIG. 7A. The differences may be due to the PUF being a different temperature during the enrollment and recovery processes, or may be due to other variations in environment which give rise to different resonance frequencies of some of the ring oscillators. The resulting Delta 724 is shown, and differs from Delta 706. The values shown with white background, such as value 725a, are above an absolute value threshold, while the values shown in grey, such as value 725b, are below an absolute value threshold. The resulting comparison bits 726, which may be denoted by $\hat{x}$, include values shown with white background and those with grey, based on the corresponding indications of Delta 724. For example bit 727a is shown with a white background and bit 727b with a grey background. The bits with a white background are bits with a high level of confidence, due to the corresponding value of Delta being above a threshold. The bits with the grey background have a low confidence level due to the corresponding value of Delta being below the threshold. The corresponding bits of matrix A are therefore color-coded in the same manner. The uncertain bits of 726 are listed as variables in 728.

The matrix A multiplied by $\hat{x}$ represents a difficult mathematical problem to solve. The problem may be reduced, however, based on the bits with a high confidence level. FIG. 7C shows an example.

FIG. 7C illustrates an example of reducing the hardness of the PUF recovery process of FIG. 7B, according to a non-limiting embodiment of the present application. As shown, the mathematical problem shown in FIG. 7B may be reduced by treating the bits with a high confidence level accordingly. For example, the problem may be broken into $A_{good}$ and $\hat{x}_{good}$ and $A_{uncertain}$ and $\hat{x}_{uncertain}$. By rearranging as shown in the second row of FIG. 7C, the problem may be solved. In this non-limiting example, bit 730 is shown with bold hatching to indicate it was corrected. In this case it was corrected from a 1 to a 0. Thus, the hard mathematical problem of FIG. 7B may be reduced and solved by using the intrinsic information about the confidence level of the comparison bits. This is information which an attacker will not have, and thus the attacker will not be able to reduce the problem as shown in FIG. 7C.

FIGS. 7B-7C illustrate an example of a learning with errors problem. Thus, it should be appreciated that aspects of the present application provide a PUF that may perform a recovery operation by executing a learning with errors problem.

Figure 8:
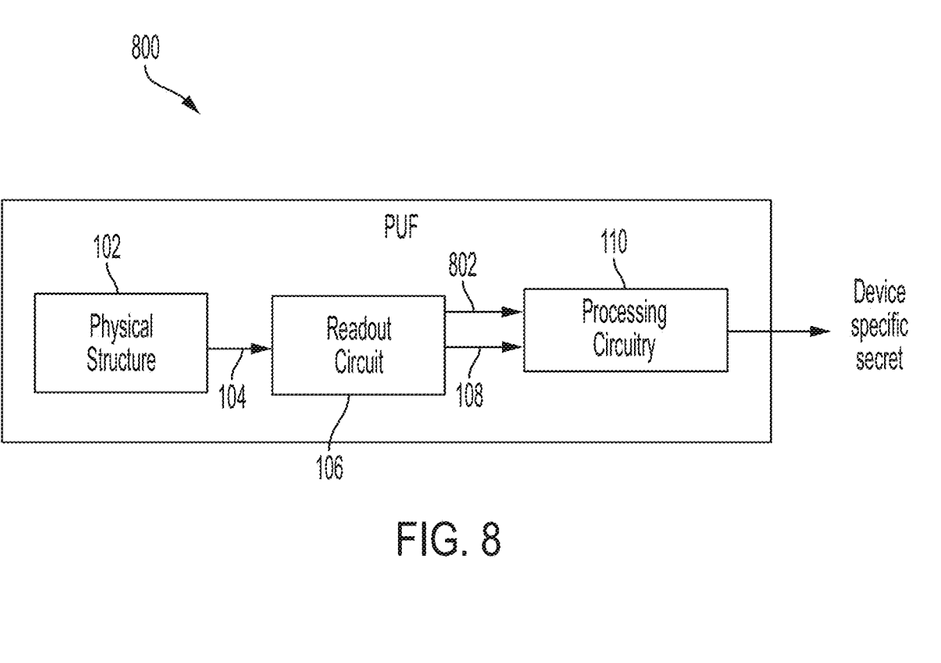
FIG. 8 is a block diagram of an alternative PUF, according to a non-limiting embodiment of the present application.

FIG. 8 is a block diagram of an alternative PUF, according to a non-limiting embodiment of the present application. The PUF 800 of FIG. 8 differs from the PUF 100 of FIG. 1 in that the intrinsic information is provided from the readout circuit to the processing circuitry as signal 802, rather than directly from the physical structure. Otherwise, the PUFs 800 and 100 are the same.

The aspects described herein may provide various benefits. Some examples have been listed already, and others are listed below. It should be appreciated that not every aspect necessarily provides every benefit, and that benefits other than those listed explicitly here may be realized. Aspects of the present application provide a PUF that can correct for errors in the PUF signal during a recovery operation without the use of error correction codes. The PUF may execute a learning with errors problem to reduce the difficulty of a mathematical problem using intrinsic information not available outside the PUF, and therefore not available to a hacker, thus making the PUF secure. The PUF may utilize information about the confidence level of comparison bits generated as part of the recovery process. The confidence levels may be determined during manufacture in some embodiments, and stored for subsequent use, thus simplifying their use by PUFs on different chips manufactured from a same wafer.

Aspects of the present application may apply to either weak PUFs or strong PUFs. Weak PUFs are those which may require only a single challenge-response pair. The aspects described herein may apply to such PUFs. However, the aspects described herein are not limited to use with weak PUFs. Rather, they may be used with strong PUFs as well.

The terms "approximately", "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A physical unclonable function (PUF), comprising:
a plurality of physical structures exhibiting respective values of a first property;
comparison circuitry configured to produce a first bit stream having a plurality of bits, wherein each of at least two bits of the plurality of bits represents a comparison value of a comparison between the respective values of the first property read from a respective pair of the plurality of physical structures, wherein said respective pair comprises a first physical structure of the plurality of physical structures and a second physical structure of the plurality of physical structures, wherein the first physical structure is different than the second physical structure;
enrollment processing circuitry coupled to an output of the comparison circuitry and configured to receive the first bit stream from the comparison circuitry and generate:
a secret as a hash of the first bit stream;
information indicative of a confidence level of bits in the first bit stream, wherein the information indicative of a confidence level is stored; and
a sketch; and
recovery processing circuitry configured to process in combination a second bit stream, the sketch, and the stored information indicative of the confidence level of bits in the first bit stream generated by the enrollment processing circuitry.

2. The PUF of claim 1, wherein the plurality of physical structures are ring oscillators, and wherein the first property is a resonance frequency.

3. The PUF of claim 1, wherein the plurality of physical structures are resistors, and wherein the first property is a resistance.

4. The PUF of claim 1, wherein the plurality of physical structures are resistors, and wherein the first property is a capacitance.

5. The PUF of claim 1, wherein the recovery processing circuitry is configured to process the second bit stream, the sketch, and the information indicative of a confidence level of bits in the first bit stream to solve a learning with errors (LWE) problem.

6. The PUF of claim 5, wherein the recovery processing circuitry is configured to reduce a hardness of the LWE problem by applying the information indicative of a confidence level of bits in the first bit stream.

7. The PUF of claim 1, wherein the enrollment processing circuitry is configured to generate the sketch by multiplying the first bit stream by a matrix.

8. The PUF of claim 7, wherein the matrix is a random matrix.

9. The PUF of claim 7, wherein the enrollment processing circuitry and/or recovery processing circuitry is configured to generate the matrix from a seed.

10. The PUF of claim 1, wherein the recovery processing circuitry is configured to calculate the secret without using error correction.

11. A physical unclonable function (PUF), comprising:
a plurality of physical structures having respective values of a first property;
readout circuitry configured to compare pairs of values of the first property read from respective pairs of the plurality of physical structures and to generate a digital stream of bits from a result of the comparisons, wherein each of at least two bits of the digital stream of bits represents a comparison value of a comparison between the respective values of the first property read from a respective pair of the plurality of physical structures, wherein said respective pair comprises a first physical structure of the plurality of physical structures and a second physical structure of the plurality of physical structures, wherein the first physical structure is different than the second physical structure; and
first processing circuitry configured to receive the digital stream of bits and generate:
a secret as a hash of the digital stream of bits;
information indicative of a confidence level of bits in the digital stream of bits, wherein the information indicative of a confidence level is stored; and
a sketch from the digital stream of bits; and
second processing circuitry configured to recover the secret by processing in combination the digital stream of bits, the sketch, and the stored information indicative of the confidence level of bits in the digital stream of bits generated by the first processing circuitry.

12. The PUF of claim 11, wherein the plurality of physical structures are ring oscillators, and wherein the first property is a resonance frequency.

13. The PUF of claim 11, wherein the plurality of physical structures are resistors, and wherein the first property is a resistance.

14. The PUF of claim 11, wherein the first processing circuitry is configured to determine a susceptibility to flipping of bits in the digital stream of bits.

15. The PUF of claim 11, wherein the second processing circuitry is configured to solve a learning with errors (LWE) problem using the digital stream of bits, the sketch, and the information indicative of the confidence level of bits in the digital stream of bits.

16. The PUF of claim 15, wherein the first processing circuitry is configured to generate the sketch by multiplying the digital stream of bits by a matrix.

17. A method of operating a physical unclonable function (PUF) to recover a secret, comprising:
receiving a response bit stream resulting from application of a plurality of challenge values to the PUF;
receiving a sketch comprising a product of a vector and a matrix;
receiving stored information indicative of a confidence level of bits in the response bit stream; and
solving a learning with errors (LWE) problem using the response bit stream, the sketch, and the information indicative of the confidence level of bits in the response bit stream.

18. The method of claim 17, wherein solving the LWE problem comprises reducing a hardness of the LWE problem using the confidence level of bits in the response bit stream.

19. The method of claim 17, wherein the response bit stream represents a hash of a raw bit stream.

* * * * *